Patented Sept. 9, 1952

2,610,172

UNITED STATES PATENT OFFICE 2,610,172

PROCESS OF CONDENSING A 4-AMINO POLYARYL METHANE AND ACETONE

Joseph R. Ingram, Nitro, W. Va., assignor to Monsanto Chemical Company, St. Louis, Mo., a corporation of Delaware No Drawing. Application July 2, 1949, Serial No. 102,959

6 Claims. (Cl. 260—65)

1

This invention relates to new compositions of matter. More particularly it relates to aralkylated 1,2-dihydroquinolines.

It has been found in accordance with this invention that a new and novel family of compounds possessing useful properties may be prepared by condensing an aliphatic ketone with a substituted aniline of the general formula

where A is representative of one or more aromatic nuclei linked to the para position of an aniline nucleus through an alkylene group R. These primary amines may also be called 4-amino polyaryl alkanes.

The new compounds have excellent oxidative inhibiting properties for organic substances which tend to deteriorate due to heat or by absorption of oxygen from the air, as for example, rubber and allied gums, unsaturated vegetable oils, essential oils, petroleum oils, and their derivatives such as gasoline, soaps, aldehydes, synthetic resins, and the like. In contrast to most oxidative inhibiting materials containing nitrogen the new compounds are resistant to staining and discoloration and consequently may be employed, as for example, in white rubber vulcanizates Further, the new compounds are also useful for improving the flexing properties of rubber vulcanizates containing carbon black.

The new compounds are readily prepared by condensing, in the presence of a suitable catalyst, an aliphatic ketone containing at least one methyl group, such as acetone, methyl ethyl ketone, methyl isopropyl ketone, methyl isobutyl ketone, and the like with a para aralkyl substituted aniline such as the 4-amino-diarylalkanes, the 4-amino-triarylalkanes, and the 4-amino-tetraarylalkanes. As specific examples of these primary amines are 4-amino-diphenylmethane, 4 - amino-2′-methyl-diphenylmethane, 4-amino-triphenylmethane, 4-amino-tetraphenylmethane, beta-(4-amino phenyl) ethylbenzene, alpha-(4-amino phenyl) ethylbenzene, alpha-(4-amino phenyl) propylbenzene, alpha-(4-amino phenyl) beta-, gamma-diphenylpropane, and the like.

The chemical structure of the products obtained by condensing an aliphatic ketone with an aralkyl substituted aniline is not known but it is believed that the products of the reaction are a mixture of aralkylated 1,2-dihydroquinolines of which the chief component is a 6 aralkyl substituted 1,2-dihydroquinoline. However, the present invention is not limited to any assumption as to chemical structure but pertains broadly to the aralkylated 1,2-dihydroquinolines obtained by reacting an aliphatic ketone with an aralkyl substituted aniline wherein the primary amine group is in the 4-position with respect to the aralkyl substituent.

2

As exemplary of the preparation of the new chemicals the following examples are illustrative and in no wise are to be construed as limitative thereof.

Example 1

Acetone vapors were passed into a suitable reaction vessel equipped with a thermometer, stirrer, and reflux condenser, and containing 22.5 parts by weight (substantiallly 0.12 mol) of 4-amino diphenylmethane,

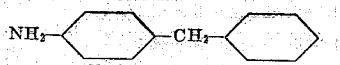

plus a small amount of a dehydrating catalyst at 120°–125° C. for over 24 hours. Upon removal of the excess acetone and water of condensation by distillation, 28 parts by weight (approximately 86% yield) of a resinous product believed to consist principally of 6-benzyl-2,2,4-trimethyl-1,2-dihydroquinoline was obtained.

The 4-amino diphenylmethane employed in the above condensation was obtained by simply reducing 4-nitro diphenylmethane. The latter chemical was prepared according to the procedure described in Berichte, vol. 29, p. 1303.

Example 2

Acetone vapors were passed into a suitable reaction vessel, equipped with a stirrer, thermometer, and reflux condenser, and containing 22.5 parts by weight (substantially 0.086 mol) of 4-amino triphenylmethane,

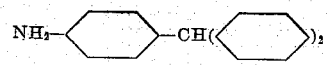

plus 0.2 part by weight of iodine at 120°–125° C. for a period of 27.5 hours. The excess acetone and water of condensation were distilled off and 27 parts by weight (approximately 93% yield) of a resinous product believed to consist principally of 6-diphenylmethyl-2,2,4-trimethyl-1,2-dihydroquinoline was obtained. The 4-amino triphenylmethane employed in the above condensation was prepared according to the procedure described in Annalen 206, p. 155 using benzhydrol and aniline hydrochloride as the starting materials and employing anhydrous zinc chloride as the catalyst.

In a similar manner 4-amino tetraphenylmethane,

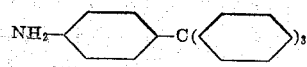

condenses with acetone to produce an aralkylated 1,2 - dihydroquinoline believed to consist principally of 6-triphenylmethyl-2,2,4-trimethyl-1,2-dihydroquinoline. 4-amino tetraphenylmethane may be prepared by condensing triphenyl carbinol with aniline hydrochloride in the presence of anhydrous zinc chloride.

Similarly α-(4-amino phenyl) ethylbenzene,

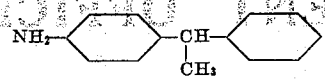

prepared according to the method described in Berichte, vol. 38, p. 1763, condenses with acetone to produce an aralkylated 1,2-dihydroquinoline believed to consist principally of 6-(α-methyl benzyl)-2,2,4-trimethyl-1,2-dihydroquinoline.

As exemplary of the oxidative inhibiting properties of the new aralkylated 1,2-dihydroquinolines the following hevea rubber stocks suitable for the tread portion of an automobile tire were compounded comprising

| Stock | Parts by weight | | |
|---|---|---|---|
| | A | B | C |
| Smoked sheets rubber | 100. | 100. | 100. |
| Carbon black | 50. | 50. | 50. |
| Zinc oxide | 5. | 5. | 5. |
| Pine tar | 2. | 2. | 2. |
| Stearic acid | 3. | 3. | 3. |
| Sulfur | 3. | 3. | 3. |
| Mercaptobenzothiazole | 0.75 | 0.75 | 0.75 |
| Aralkylated 1,2-dihydroquinoline of Example 1 | 1.0 | | |
| Aralkylated 1,2-dihydroquinoline of Example 2 | | 1.0 | |

The rubber stocks so compounded were vulcanized in a press for 60 and 90 minutes respectively at 135° C. Test strips were cut from the vulcanized stocks and artificially aged for 3 hours at 135° C. in an air bomb under 60 pounds per square inch pressure. The table below sets forth the percent of the original tensiles retained.

Table I

| Stock | Minutes Cure at 135° C. | Percent of Original Tensile Retained After Aging 3 hours at 135° C., 60 lbs./in.² |
|---|---|---|
| A | 60 | 47 |
| B | 60 | 51 |
| C | 60 | 31 |
| A | 90 | 47 |
| B | 90 | 58 |
| C | 90 | 35 |

The foregoing data clearly show that the various rubber stocks treated with aralkylated 1,2-dihydroquinolines possess excellent age resistant properties. These new compounds also exhibit good anti-flex cracking properties, as for example, the following results were obtained upon flexing the cured hevea rubber stocks B and C above described, employing a flexing machine as set forth by L. V. Cooper, Analytical Edition of Industrial and Engineering Chemistry, vol. 2, No. 4, pp. 391–394.

Table II

| Stock | (kilocycles to failure) | |
|---|---|---|
| | B | C |
| Unaged | 222 | 189 |
| Aged 6 hours at 121° C. in an air bomb at 80 lbs./in.² | 245 | 172 |
| Aged 72 hours at 100° C. in an air circulating oven | 92 | 37 |

Obviously the examples set forth above show that rubber compositions containing an aralkylated 1,2-dihydroquinoline are markedly resistant to the deteriorating influences of flexing, heat and oxidation. The new aralkylated 1,2-dihydroquinolines are further characterized by their non-discoloring properties, that is they exhibit remarkable resistance to light deterioration.

While the above data describes only specific compounds of the new family, all members of said class exhibit similar oxidative inhibiting properties. Other specific examples which are characterized by the properties noted above are the respective condensation products of alpha-(4-amino phenyl) ethylbenzene and beta-(4-amino phenyl) ethylbenzene with acetone.

While certain specific embodiments of this invention have been described in detail herein, it is to be understood that the invention is not so limited for many modifications may be resorted to such as varying the proportions of the new chemicals, as for example from 0.2 to 5 parts by weight per 100 parts rubber, employing rubbers other than natural rubber such as rubber substitutes, synthetic rubber, and the like whether or not admixed with fillers, pigments, accelerators, and the like, without departing from the spirit or scope of the invention.

What is claimed is:

1. The process of preparing an antioxidant composition which comprises heating at 120–125° C. under atmospheric pressure in the presence of a condensation catalyst acetone and a 4-amino polyaryl methane in which one hydrogen of methane is substituted by a 4-amino phenyl group and at least one other hydrogen is substituted by a monocyclic aryl hydrocarbon group, any remaining valences of the methane carbon being satisfied by hydrogen, removing excess acetone and water of condensation.

2. The process of preparing an antioxidant composition which comprises heating at 120–125° C. under atmospheric pressure in the presence of a condensation catalyst acetone and 4-aminodiphenylmethane, removing excess acetone and water of condensation.

3. The process of preparing an antioxidant composition which comprises heating at 120–125° C. under atmospheric pressure in the presence of a condensation catalyst acetone and 4-aminotriphenylmethane, removing excess acetone and water of condensation.

4. The product prepared by the process of claim 1.

5. The product prepared by the process of claim 2.

6. The product prepared by the process of claim 3.

JOSEPH R. INGRAM.

REFERENCES CITED

The following references are of record in the file of this patent:

UNITED STATES PATENTS

| Number | Name | Date |
|---|---|---|
| 2,095,126 | Craig | Oct. 5, 1937 |
| 2,160,200 | Dunbrook et al. | May 20, 1939 |
| 2,268,419 | Paul | Dec. 30, 1941 |
| 2,530,774 | Kehe | Nov. 21, 1950 |

OTHER REFERENCES

Reddelien et al., Berichte, vol. 65, pp. 1511–1521 (1932).

Busch et al., Berichte, vol. 38, pp. 1763–1769 (1905).

Fischer, Annalen, vol. 206, pp. 155–6 (1880).